June 5, 1951  N. FRYE  2,555,793

TRACTOR GUIDING MECHANISM

Filed April 6, 1946  2 Sheets-Sheet 1

INVENTOR.
NORMAN FRYE
BY
Merrill M. Blackburn
ATT'Y.

June 5, 1951 N. FRYE 2,555,793
TRACTOR GUIDING MECHANISM
Filed April 6, 1946 2 Sheets-Sheet 2
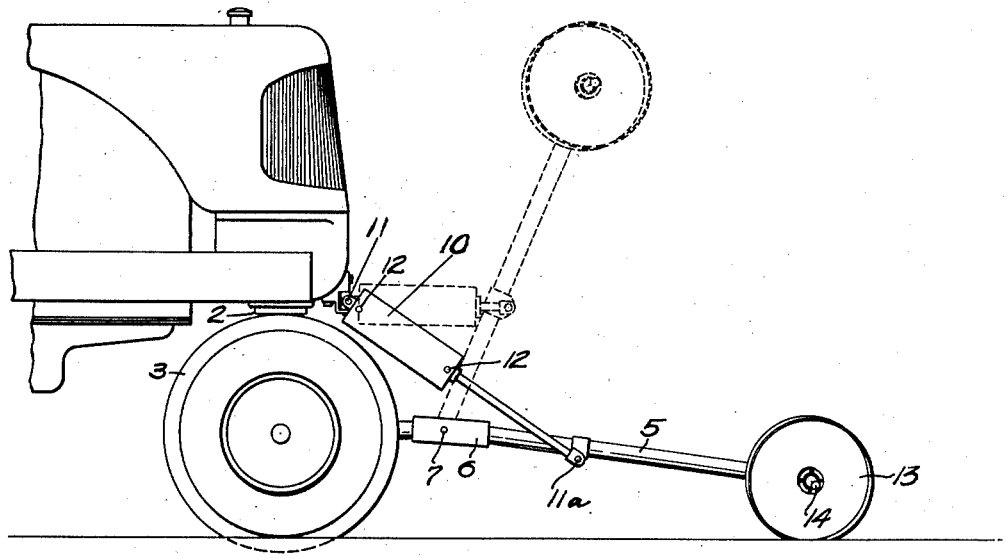
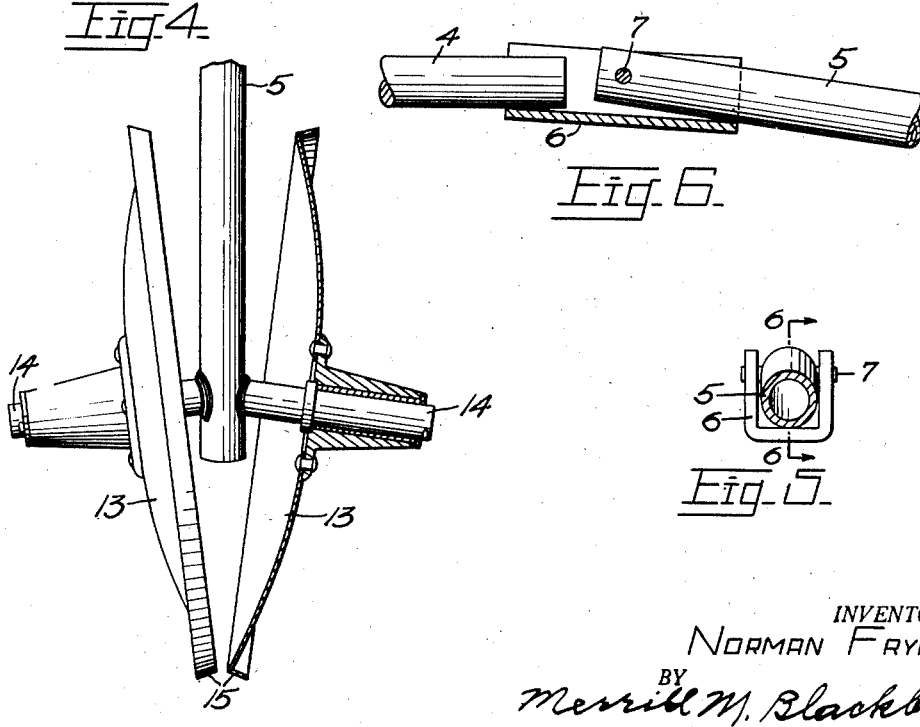
INVENTOR.
NORMAN FRYE
BY Merrill M. Blackburn
ATT'Y Patented June 5, 1951

2,555,793

UNITED STATES PATENT OFFICE 2,555,793

TRACTOR GUIDING MECHANISM

Norman Frye, near Davenport, Iowa

Application April 6, 1946, Serial No. 660,274

1 Claim. (Cl. 97—49)

My present invention relates to means to be attached to a tractor to extend forwardly thereof and follow a shallow guiding furrow or groove whereby to keep the tractor centered over the guide line formed in the earth's surface when driving across a field or garden on a previous trip. This device is particularly useful in doing planting of various types, such as planting fine seeds in rows, planting onion sets in rows, making transplantings, and in planting corn, although its use is restricted more to planting on level ground than on hilly ground.

Among the objects of this invention are the provision of a simple easily installed mechanism which is attachable to the forward end of a tractor and which will follow a groove or furrow formed in the earth's surface by a suitable marking tool attached to the tractor, as is well understood in present practice; the provision of an apparatus of the kind indicated which is so constructed that it will readily follow a pre-formed elongated mark in the field more accurately than the driver of a tractor can follow it; the provision of an apparatus of the type indicated which can be attached to a tractor as built by the manufacturer without the necessity of modification thereof; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 3 is a view similar to Fig. 1 but showing a different mechanism for raising the guiding means from the ground;

Fig. 4 represents a partial section substantially along the plane indicated by the line 4—4, Figs. 1 and 3;

Fig. 5 represents a section taken substantially along the plane indicated by the line 5—5, Fig. 1; and Fig. 6 represents a fragmentary longitudinal section taken substantially along the plane indicated by the line 6—6, Fig. 5, and showing the pivotal connection of the two sections of the bar connecting the guiding wheels to the front axle of the tractor.

Figure 1:
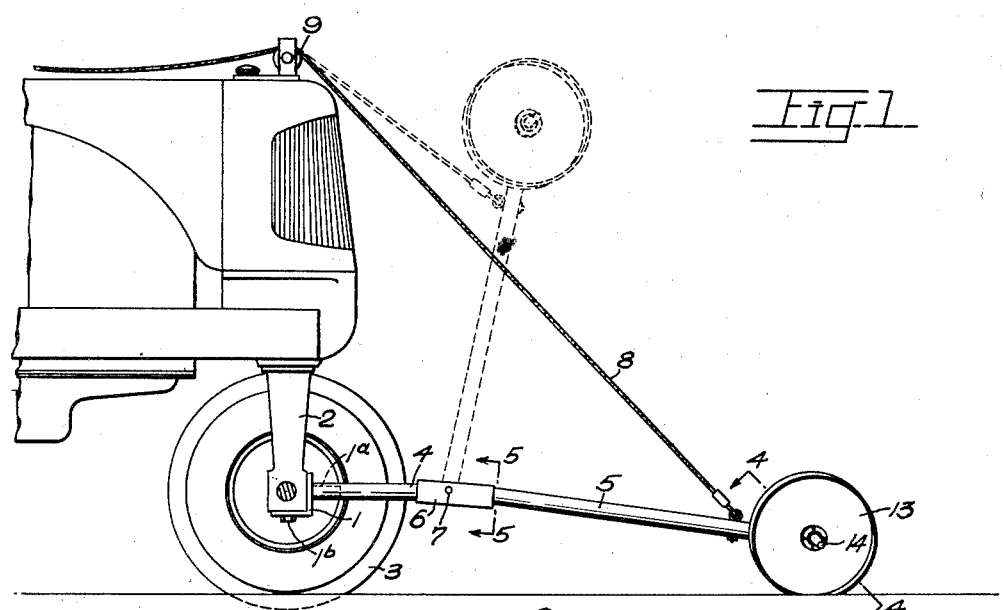
Fig. 1 is a side elevational view of the forward end portion of a tractor with one embodiment of my invention applied thereto.
Figure 2:
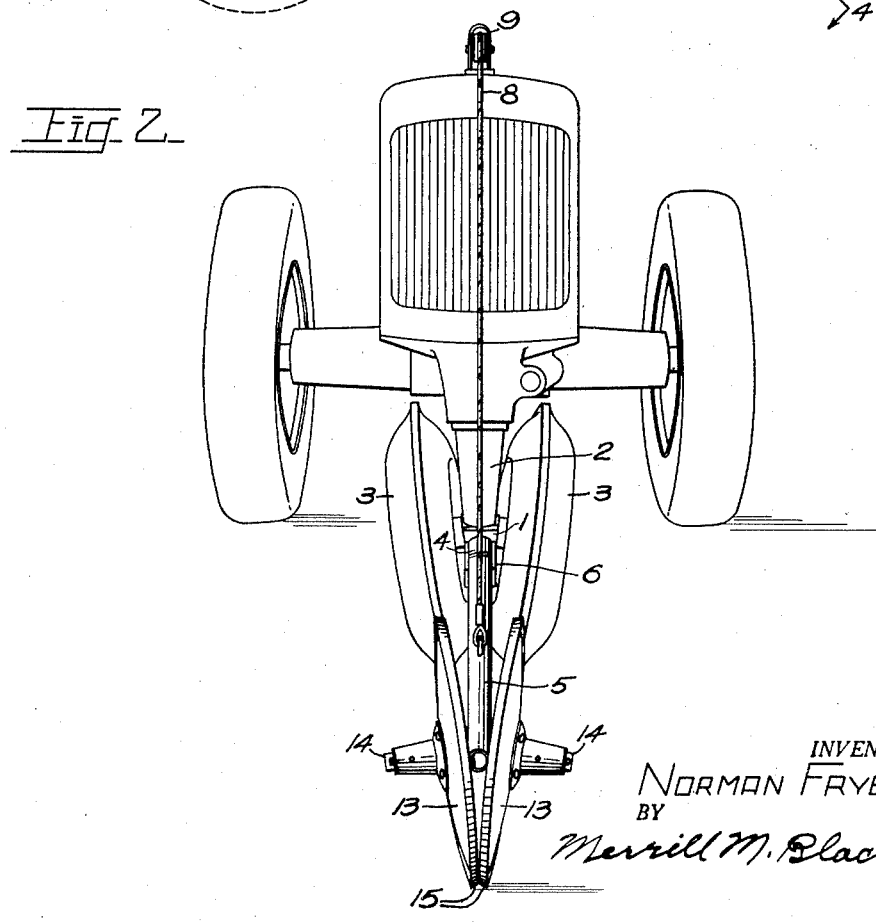
Fig. 2 is a front view of the structure shown in Fig. 1, looking somewhat downwardly thereat.

Reference will now be made in greater detail to the annexed drawings for a more complete description of this invention. In Fig. 1, the right front axle is shown as having been cut off and the right front wheel removed to expose the bracket 1 which is attached to the underside of the post 2 by means of which force is applied to the front wheels 3 to cause steering thereof. The bracket 1 has a screw-threaded stud 1a for detachable connection of the section 4 to the bracket which is fastened to the post 2 by bolts 1b screwed into the lower end of the post. The tractor shown in the present drawings is provided with a worm gearing below the radiator, the worm of this gearing being mounted on a shaft which extends back to the vicinity of the tractor seat. It is by means of this that the normal steering operation is carried out. There is usually some slack in this worm gearing so that the front wheels 3 may waver somewhat from right to left or vice versa. Use is made of this fact in connection with my invention since, because of this slack, the steering means is enabled to follow the guiding channel in the earth's surface, notwithstanding the slight tendency for the wheels 3 to avoid following that channel.

Preferably a pair of pipe sections 4 and 5 are pivotally connected by a connector 6, the pivot passing through the connector and the end of the pipe section 5 being indicated at 7. Preferably this connector is of channel shape, thus permitting the section 5, when turning on its pivot 7, to rise to the position shown in Figs. 1 and 3. Various means may be used for raising the forward end of section 5, one of these means being shown in Fig. 1 as a cable 8 passing from the forward end portion of the section 5 over the pulley 9 and back to the vicinity of the driver's seat. By means of this, the driver can, when he reaches the end of a row, lift the section 5 to the dotted line position and then turn his tractor in the usual way. If preferred, a hydraulic unit 10 can be pivotally connected to the front of the tractor, as shown at 11 in Fig. 3, and the forward end of the piston of this hydraulic may be connected to the section 5, intermediate the ends thereof, as indicated at 11a. The cylinder of the hydraulic unit may be provided at one or both ends with nipples 12 to which hose may be attached. The second end of such hose would be attached either to a suction pipe of the tractor or to a compression unit. If the rear nipple 12 is attached to the suction unit, opening of a valve in this line would permit the suction to hold the piston of the hydraulic back, raising the arm or pipe section 5 whereby to lift the disc-like rollable members 13 from the ground. On the other hand, if the forward nipple 12 is connected to a compression unit, this will force the piston back, raising the arm 5. Obviously, whichever type of lift is used, there must be provided a valve for controlling the connection of the hydraulic 10 to the source of power for operating the same. The pipe connecting the different nipples with the source of power should be flexible because of the amount of movement which must be permitted.

Attached to the forward end portion of the arm 5 are axles 14 on which the disc-like rollable members 13 are mounted for easy turning. While I have not shown these as provided with any specific type of bearings, it is probable that it will be found desirable to use either ball or roller bearings provided with suitable dust guards to keep dust out of the bearing mechanisms.

From Fig. 4 it is apparent that these disc-like members 13 are preferably slightly cupped and are provided with outwardly turned flanges 15, the purpose of which is to keep the members 13 in the channel by engagement of the flanges 15 with the sides of the channel. It has been found that, if one flange tends to climb up one side of the channel, it digs into the wall of the channel which offers lateral resistance, and this tends to force this unit back into the middle of the channel. It is clear from Figs. 1, 3, and 4 that the disc-like members 13 are nearest together at a point approximately mid-way between the extreme bottom and the extreme forward portions thereof. Therefore, they are so positioned that the part of the flange 15 rearwardly from the bottom will extend farther laterally from the axial plane of the apparatus than the forward portion thereof. Therefore, the resistance of this flange bearing against the lateral wall of the channel tends to force the disc-like members into the center of the channel. In other words, these members tend to oppose each other and keep the guide in the middle of the channel.

It is of course understood that the specific description of structure set forth above may be departed from without departing from the spirit of my invention as disclosed herein and defined in the appended claim.

Having now described my invention, I claim:

Guiding means for a tractor, adapted to pass along a guide furrow formed in the ground, said guiding means comprising a guide wheel support attachable to the dirigible wheel means of a tractor, a pair of oppositely positioned axles fixed to said support, and a pair of guide wheels journaled on said axles, said axles extending laterally, outwardly, downwardly, and forwardly, so as to place said wheels in positions such that the wheels are closest together at their lower forward portions, each of said wheels having a central dished section arranged with its concave side facing laterally inwardly whereby the peripheral portions of said wheels at their lateral inner edges are placed substantially in contact with one another, said wheels also having laterally, outwardly flaring, relatively thin flanges, joined at their lateral inner edges to the radially outer edge portions of said dished section, said laterally outwardly flaring flanges, at their lowermost portions of the wheels, lying at an acute angle relative to the ground, whereby said flanges prevent the guide wheels from cutting into and penetrating the bottom of the guide furrow, the lateral outer edges of said flanges acting to dig into one side or the other of said furrow when the tractor guiding means is subjected to laterally directed forces, thereby resisting laterally directed forces from either direction.

NORMAN FRYE.

REFERENCES CITED

The following references are of record in the file of this patent:

UNITED STATES PATENTS

| Number | Name | Date |
|---|---|---|
| 447,938 | Campbell | Mar. 10, 1891 |
| 713,616 | Dobbin | Nov. 18, 1902 |
| 1,047,644 | James | Dec. 17, 1912 |
| 1,186,365 | Allmon | June 6, 1916 |
| 1,597,519 | Fiedler et al. | Aug. 24, 1926 |
| 1,784,534 | Nichol | Dec. 9, 1930 |
| 1,851,597 | Siems | Mar. 29, 1932 |
| 1,950,910 | Willrodt et al. | Mar. 13, 1934 |